(12) United States Patent
Lv et al.

(10) Patent No.: US 9,977,175 B2
(45) Date of Patent: May 22, 2018

(54) BACKLIGHT MODULE AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui Province (CN)

(72) Inventors: Chang Lv, Beijing (CN); Ming Fang, Beijing (CN); Jianghui Zhan, Beijing (CN); Shounian Chen, Beijing (CN); Jinmoo Park, Beijing (CN)

(73) Assignees: BOE TECHNOLOGY GROUP CO., LTD., Beijing (CN); HEFEI BOE OPTOELECTRONICS TECHNOLOGY CO, LTD., Hefei (CN)

( * ) Notice: Subject to any disclaimer, the term of this patent is extended or adjusted under 35 U.S.C. 154(b) by 0 days. days.

(21) Appl. No.: 14/800,584

(22) Filed: Jul. 15, 2015

(65) Prior Publication Data

US 2016/0139318 A1 May 19, 2016

(30) Foreign Application Priority Data

Nov. 13, 2014 (CN) .......................... 2014 1 0642129

(51) Int. Cl.
*F21V 7/04* (2006.01)
*F21V 8/00* (2006.01)

(52) U.S. Cl.
CPC ......... *G02B 6/0083* (2013.01); *G02B 6/0066* (2013.01)

(58) Field of Classification Search
CPC ... G02B 6/0055; G02B 6/0031; G02B 6/0086
(Continued)

(56) References Cited

U.S. PATENT DOCUMENTS 4,996,632 A * 2/1991 Aikens ................... B60Q 3/004
362/601
6,926,419 B2 * 8/2005 An ..................... G02F 1/133605
362/23.18
(Continued)

FOREIGN PATENT DOCUMENTS

CN 1042779 A 6/1990
CN 201145166 Y 11/2008
(Continued)

OTHER PUBLICATIONS

Office Action in Chinese Application No. 201410642129.2 dated Aug. 19, 2016, with English translation. 14 pages.
(Continued)

*Primary Examiner* — William Carter
(74) *Attorney, Agent, or Firm* — Womble Bond Dickinson (US) LLP

(57) ABSTRACT

The present disclosure provides a backlight module and a display apparatus. The backlight module comprises a light guide plate, a light source located at one side of the light guide plate at the light incident surface, a lampshade accommodating the light source and being provided with an opening structure with an adjustable size and/or position, and a control device for adjustment of the size and/or position of the opening structure on the lampshade. The amount of light which is irradiated by the backlight module to the light incident surface of the light guide plate may be varied by providing the lampshade which accommodates the light source and disposing the opening structure with an adjustable size and/or position on the lampshade, to achieve an adjustment of the brightness of a display without requiring for adjustment of the current flowing through the light source in the backlight module, thereby causing no impact on the life of the light source.

7 Claims, 3 Drawing Sheets

(58) Field of Classification Search
USPC .................................................. 362/600–634
See application file for complete search history.

(56) References Cited

U.S. PATENT DOCUMENTS

| | | | | |
|---|---|---|---|---|
| 7,350,952 | B2* | 4/2008 | Nishigaki | G02B 6/0028 |
| | | | | 362/612 |
| 2005/0140258 | A1 | 6/2005 | Leu et al. | |
| 2006/0050535 | A1* | 3/2006 | Chang | G02B 6/0023 |
| | | | | 362/621 |
| 2006/0221619 | A1 | 10/2006 | Nishigaki | |
| 2007/0183137 | A1* | 8/2007 | Iwasaki | G02B 6/0021 |
| | | | | 362/97.1 |

FOREIGN PATENT DOCUMENTS

| | | |
|---|---|---|
| CN | 201757353 U | 3/2011 |
| CN | 202056745 U | 11/2011 |
| CN | 202065764 U | 12/2011 |
| CN | 202176984 U | 3/2012 |
| CN | 102401271 A | 4/2012 |
| CN | 102650402 A | 8/2012 |
| CN | 202361228 U | 8/2012 |
| CN | 202419342 U | 9/2012 |
| CN | 102878507 A | 1/2013 |
| CN | 203082671 U | 7/2013 |
| CN | 203131546 U | 8/2013 |
| CN | 203384781 U | 1/2014 |
| CN | 203549549 U | 4/2014 |
| CN | 203596949 U | 5/2014 |
| CN | 103883952 A | 6/2014 |
| CN | 203656819 U | 6/2014 |
| CN | 203880500 U | 10/2014 |
| JP | 2000164008 A | 6/2000 |

OTHER PUBLICATIONS

Office Action in Chinese Application No. 201410642129.2 dated Mar. 14, 2017, with English translation. 10 pages.

* cited by examiner

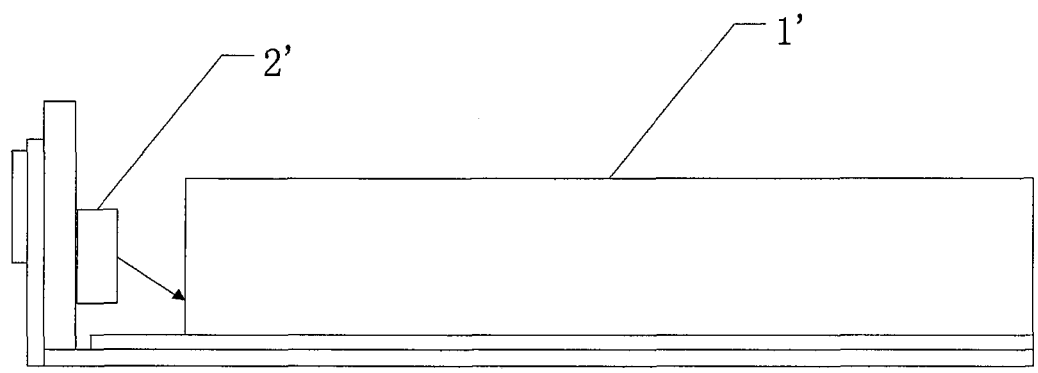
FIG. 1  - - PRIOR ART - -
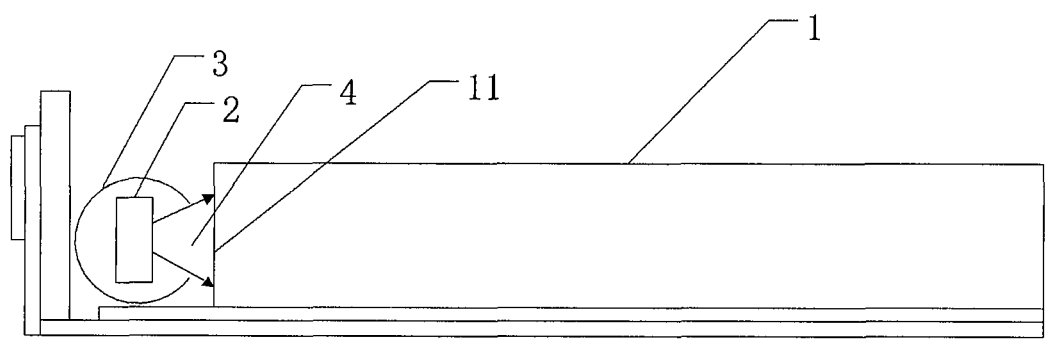
FIG. 2
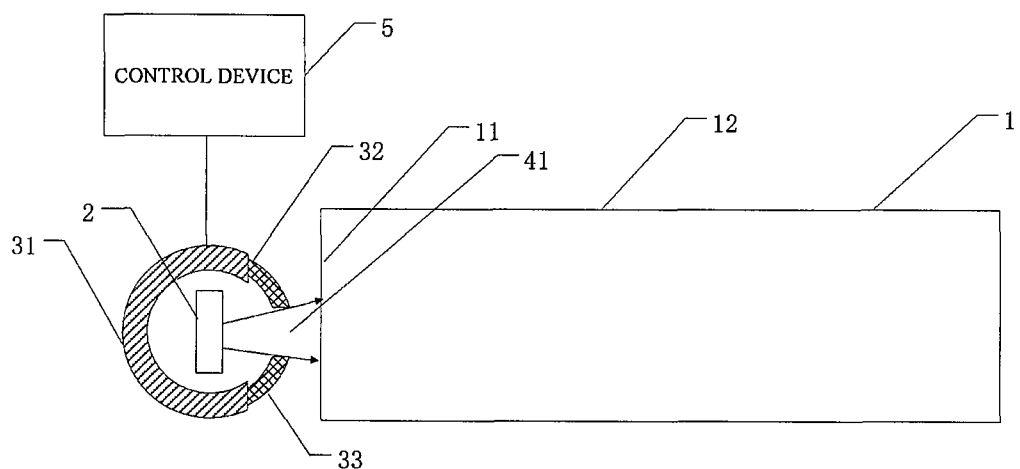
FIG. 3

BACKLIGHT MODULE AND DISPLAY APPARATUS

RELATED APPLICATIONS

The present application claims the benefit of Chinese Patent Application No. 201410642129.2, filed Nov. 13, 2014, the entire disclosure of which is incorporated herein by reference.

FIELD OF THE DISCLOSURE

The present disclosure relates to the field of display technologies, and particularly to a backlight module and a display apparatus.

BACKGROUND OF THE DISCLOSURE

The backlight module is among important components of a liquid crystal display. Since the liquid crystal is non-luminous itself, the backlight module is required for supplying light with sufficient brightness and uniform distribution for the liquid crystal display, such that the liquid crystal display can display images normally.

As is shown in FIG. 1, a traditional backlight module comprises a light source 2' and a light guide plate 1', wherein the light source 2' is located at one side of the light guide plate 1' at the light incident surface. In operation, the light emitted from the light source 2' enters the light guide plate 1' through the light incident surface of the light guide plate 1', and exits via the light emergent surface of the light guide plate 1' after being reflected by the bottom surface of the light guide plate 1', thereby providing the display with uniform backlight. At present, the adjustment of the brightness of the display is mainly achieved by adjusting the current flowing through the light source in the backlight module, which may easily cause an undesired impact on the service life of the light source.

SUMMARY OF THE DISCLOSURE

It is an object of the present disclosure to provide a backlight module and a display apparatus, which can achieve an adjustment of the brightness of the display without requiring for adjustment of the current flowing through the light source.

According to a first aspect of the present disclosure, there is provided a backlight module, comprising: a light guide plate; a light source located at one side of the light guide plate at the light incident surface; a lampshade accommodating the light source and being provided with an opening structure with an adjustable size and/or position; and a control device for adjustment of the size and/or position of the opening structure on the lampshade.

Further, the lampshade comprises a first accommodation part, and the opening structure comprises a first opening provided on the first accommodation part.

Further, the first opening is opposite to the light incident surface of the light guide plate, one end of the first opening being provided with a first extendable/retractable part, the other end of the first opening being provided with a second extendable/retractable part, and the control device performs the adjustment of the size and/or position of the opening structure by controlling the extension/retraction of at least one of the first extendable/retractable part and the second extendable/retractable part.

Further, the control device performs the adjustment of the position of the opening structure by controlling the rotation of the first accommodation part.

Further, the lampshade further comprises a second accommodation part which is sleeved with the first accommodation part, the opening structure further comprising a second opening provided on the second accommodation part, and the control device performs the adjustment of the size and/or position of the opening structure by controlling the rotation of at least one of the first accommodation part and the second accommodation part.

Further, the opening structure is in one of the states that the first opening is completely, partially or completely not aligned with the second opening.

Further, one of the first accommodation part and the second accommodation part is held fixed, the other one being rotatable.

Further, the first accommodation part and the second accommodation part are coaxial.

Further, the control device comprises a signal receiving unit and a controlling unit, the signal receiving unit being used for receipt of a brightness adjustment signal, the controlling unit being used for adjustment of the size and/or position of the opening structure on the lampshade based on the received brightness adjustment signal.

According to a second aspect of the present disclosure, there is further provided a display apparatus which comprises the backlight module as described in the first aspect of the present disclosure.

Embodiments of the present disclosure may vary the amount of light which is irradiated by the backlight module to the light incident surface of the light guide plate by providing the lampshade which accommodates the light source and disposing the opening structure with an adjustable size and/or position on the lampshade, to achieve an adjustment of the brightness of a display without requiring for adjustment of the current flowing through the light source in the backlight module, thereby causing no impact on the life of the light source.

BRIEF DESCRIPTION OF THE DRAWINGS

FIG. 1 is a schematic diagram of an backlight module in the prior art;

FIG. 2 is an overview diagram of a backlight module according to an embodiment of the present disclosure;

FIG. 3 is a schematic diagram of a backlight module according to an embodiment of the present disclosure;

DETAILED DESCRIPTION OF THE DISCLOSURE

Figure 4:
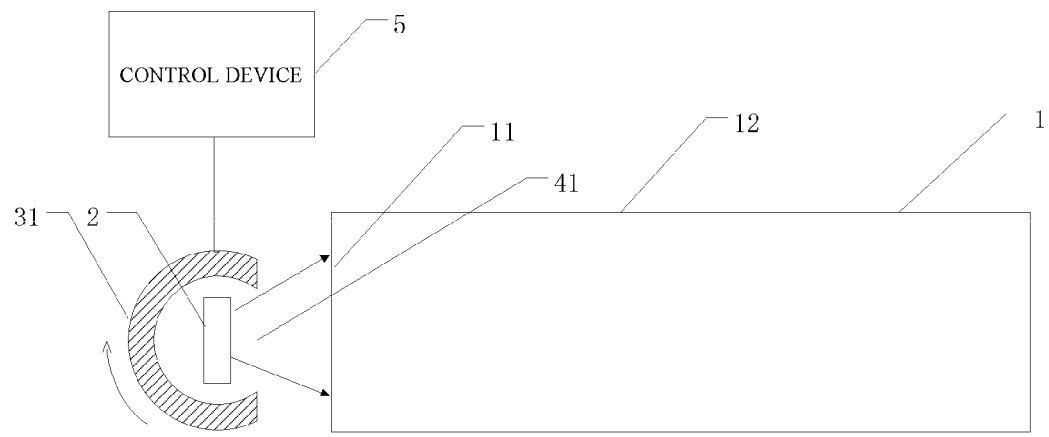
FIG. 4 is a schematic diagram of another backlight module according to an embodiment of the present disclosure.

Embodiments of the present disclosure are further described below in detail with reference to the accompanying drawings. The following embodiments are for illustration of the present disclosure, and not limitation of the scope of the present disclosure.

FIG. 2 is an overview diagram of a backlight module according to an embodiment of the present disclosure. The backlight module comprises a light guide plate 1 and a light source 2 which is located at one side of the light guide plate 1 at the light incident surface 11. The backlight module further comprises a lampshade 3 which accommodates the light source 2, wherein the lampshade 3 is provided with an opening structure 4 with an adjustable size and/or position.

The backlight module according to the embodiment of the present disclosure may vary the amount of light which is irradiated by the light source 2 to the light incident surface 11 of the light guide plate 1 by providing the lampshade 3 which accommodates the light source 2 and disposing the opening structure 4 with an adjustable size and/or position on the lampshade 3, to achieve an adjustment of the brightness of the display where the backlight module is located without requiring for adjustment of the current flowing through the light source 2 in the backlight module, thereby causing no impact on the life of the light source 2.

Referring to FIG. 3, which is a schematic diagram of a backlight module according to an embodiment of the present disclosure. The backlight module may comprise a light guide plate 1, a light source 2 located at one side of the light guide plate 1 at the light incident surface 11, and a lampshade accommodating the light source 2, wherein the lampshade is provided with an opening structure and comprises a first accommodation part 31 which is provided with a first opening 41 opposite to the light incident surface 11 of the light guide plate 1. As is shown in FIG. 3, the cross section of the first accommodation part 31 may be arc-shaped, with the first opening 41 provided on the first accommodation part 31 being the opening structure of the lampshade. The first opening 41 is provided with a first extendable/retractable part 32 on one end thereof and a second extendable/retractable part 33 on the other end thereof. The backlight module further comprises a control device 5 which is used for performing the adjustment of the size and/or position of the opening structure by controlling the extension/retraction of at least one of the first extendable/retractable part 32 and the second extendable/retractable part 33.

To this end, the control device 5 may comprise a signal receiving unit and a controlling unit, wherein the signal receiving unit may receive a brightness adjustment signal sent from the circuitry in the display where the backlight module is located, and the controlling unit performs the adjustment of the size and/or position of the first opening 41 by controlling the extension/retraction of at least one of the first extendable/retractable part 32 and the second extendable/retractable part 33 based on the brightness adjustment signal. For example, in case the received brightness adjustment signal indicates that the brightness is to be increased, the controlling unit will control the first extendable/retractable part 32 and the second extendable/retractable part 33 to retract, such that the spacing between the first extendable/retractable part 32 and the second extendable/retractable part 33 is enlarged, and thus the first opening 41 is enlarged. The amount of light that is irradiated by the light source 2 to the light incident surface 11 of the light guide plate 1 is therefore increased and in turn, the amount of light that is transmitted through the light emergent surface 12 of the light guide plate 1 is increased, thereby resulting in an increase in the brightness of the display. Instead, in case the received brightness adjustment signal indicates that the brightness is to be reduced, the controlling unit will control the first extendable/retractable part 32 and the second extendable/retractable part 33 to extend, such that the spacing between the first extendable/retractable part 32 and the second extendable/retractable part 33 is narrowed, and thus the first opening 41 is narrowed. The amount of light that is irradiated by the light source 2 to the light incident surface 11 of the light guide plate 1 is therefore decreased and in turn, the amount of light that is transmitted through the light emergent surface 12 of the light guide plate 1 is decreased, thereby resulting in a decrease in the brightness of the display. Furthermore, the controlling unit may also have individual control over the extension/retraction of each of the first extendable/retractable part 32 and the second extendable/retractable part 33 based on the brightness adjustment signal. For example, only the first extendable/retractable part 32 may be controlled to extend/retract, such that both the size and the position of the first opening 41 is adjusted.

It is understood that the first extendable/retractable part 32 and the second extendable/retractable part 33 can be implemented with any of the known collapsible structures, and thus will not be discussed here in detail.

Referring to FIG. 4, which is a schematic diagram of another backlight module according to an embodiment of the present disclosure. The backlight module may comprise a light guide plate 1, a light source 2 located at one side of the light guide plate 1 at the light incident surface 11, and a lampshade accommodating the light source 2, wherein the lampshade is provided with an opening structure and comprises a first accommodation part 31. As is shown in FIG. 4, the cross section of the first accommodation part 31 may be arc-shaped, with the opening structure of the lampshade being a first opening 41 provided on the first accommodation part 31. The backlight module further comprises a control device 5 which is used for performing the adjustment of the position of the opening structure by controlling the rotation of the first accommodation part 31. In the example illustrated in the figure, the rotation axis of the first accommodation part 31 is perpendicular to the direction of the thickness of the light guide plate 1.

Figure 5:
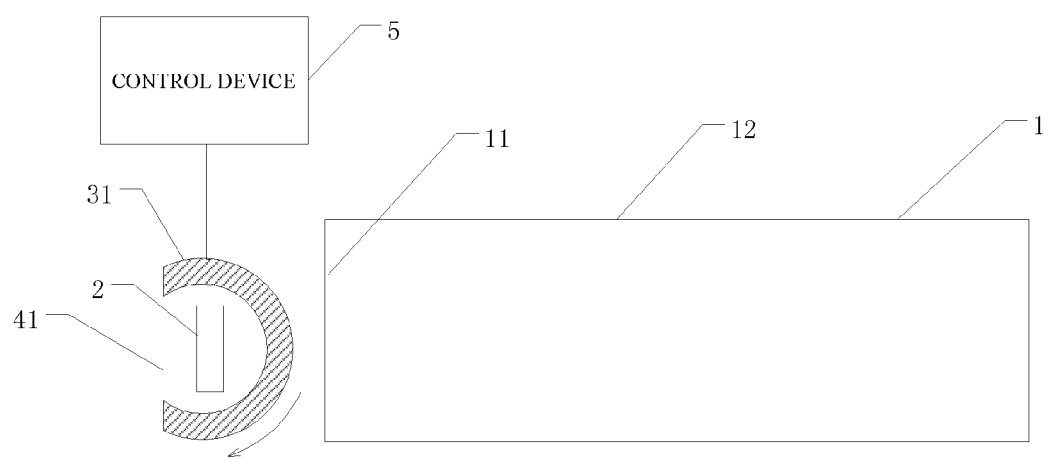
FIG. 5 is a schematic diagram of the operations for reduction of the brightness utilizing the backlight module as shown in FIG. 4.

To this end, the control device 5 may comprise a signal receiving unit and a controlling unit, wherein the signal receiving unit may receive a brightness adjustment signal sent from the circuitry in the display where the backlight module is located, and the controlling unit controls the first accommodation part 31 to rotate based on the brightness adjustment signal. For example, in case the received brightness adjustment signal indicates that the brightness is to be increased, the controlling unit will control the first accommodation part 31 to rotate in the direction as indicated by the arrow in FIG. 4, leaving a greater portion of the first opening 41 facing towards the light incident surface 11 of the light guide plate 1. As such, the amount of light that is irradiated by the light source 2 to the light incident surface 11 of the light guide plate 1 is increased and in turn, the amount of light that is transmitted through the light emergent surface 12 of the light guide plate 1 is increased, thereby resulting in an increase in the brightness of the display. When the first accommodation part 31 rotates to a point where the first opening 41 directly faces the light incident surface 11 (as shown in FIG. 4), the display is illuminated with a maximum brightness. Instead, in case the received brightness adjustment signal indicates that the brightness is to be reduced, the controlling unit will control the first accommodation part 31 to rotate such that a smaller portion of the first opening 41 directly faces the light incident surface 11 of the light guide plate 1. As such, the amount of light that is irradiated by the light source 2 to the light incident surface 11 of the light guide plate 1 is decreased and in turn, the amount of light that is transmitted through the light emergent surface 12 of the light guide plate 1 is decreased, thereby resulting in a decrease in the brightness of the display. When the first accommodation part 31 rotates to a point where the first opening 41 completely faces away from the light incident surface 11 (as shown in FIG. 5), the display is illuminated with a minimum brightness.

Figure 6:
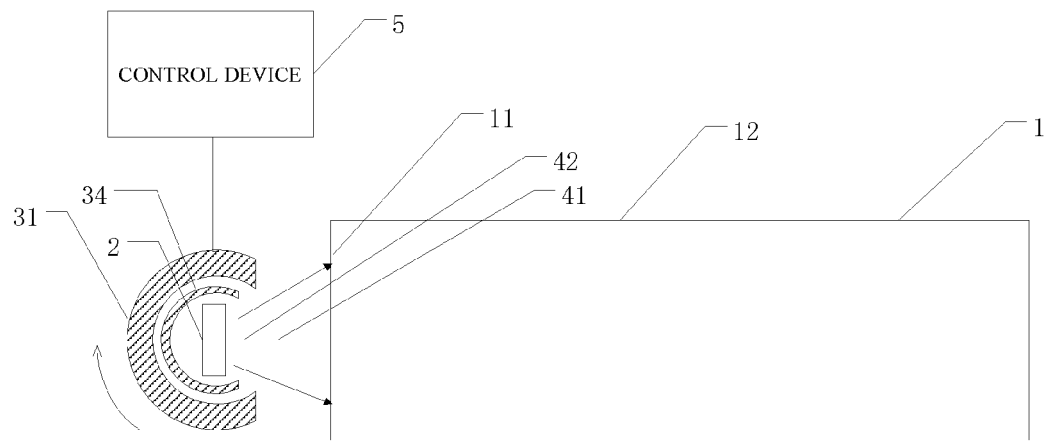
FIG. 6 is a schematic diagram of still another backlight module according to an embodiment of the present disclosure.

Referring to FIG. 6, which is a schematic diagram of still another backlight module according to an embodiment of the present disclosure. The backlight module may comprise a light guide plate 1, a light source 2 located at one side of the light guide plate 1 at the light incident surface 11, and a lampshade accommodating the light source 2, wherein the lampshade is provided with an opening structure and comprises a first accommodation part 31 and a second accommodation part 34 that is sleeved with the first accommodation part 31. The opening structure comprises a first opening 41 that is provided on the first accommodation part 31 and a second opening 42 that is provided on the second accommodation part 34. As is shown in FIG. 6, the cross sections of both the first accommodation part 31 and the second accommodation part 34 may be arc-shaped, and the first accommodation part 31 and the second accommodation part 34 may be coaxial. The backlight module further comprises a control device 5, which is used to perform the adjustment of the size and/or position of the opening structure that is formed by the first accommodation 31 and the second accommodation 34 by controlling the rotation of at least one of them. In one implementation, the second accommodation part 34 may be held fixed, with the second opening 42 provided thereon always facing towards the light incident surface 11 of the light guide plate 1, and the first accommodation part 31 may rotate to achieve the adjustment of the size and/or position of the opening structure under the control of the control device 5. In the example illustrated in the figure, the rotation axis of the first accommodation part 31 is perpendicular to the direction of the thickness of the light guide plate 1.

Figure 7:
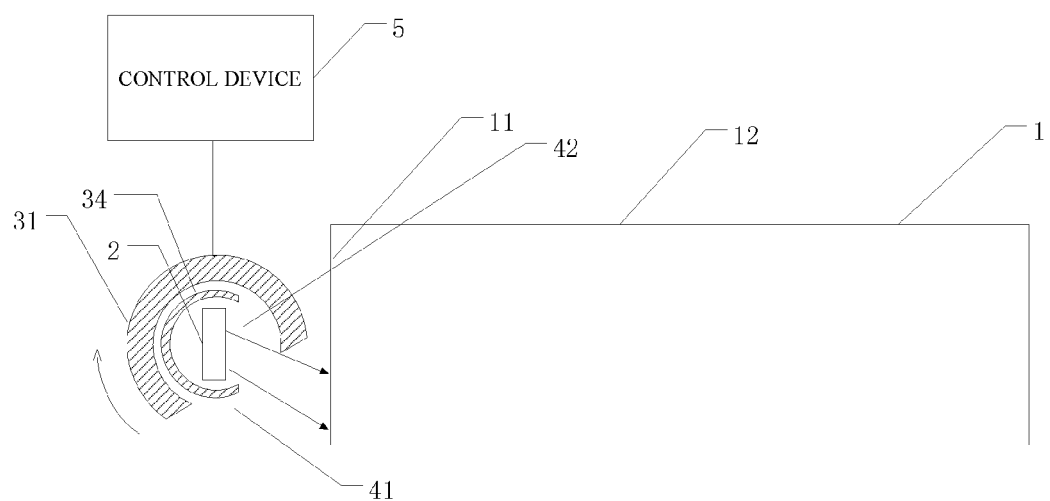
FIG. 7 is a schematic diagram of the operations for reduction of the brightness utilizing the backlight module as shown in FIG. 6.

To this end, the control device 5 may comprise a signal receiving unit and a controlling unit, wherein the signal receiving unit may receive a brightness adjustment signal sent from the circuitry in the display where the backlight module is located, and the controlling unit controls the first accommodation part 31 to rotate based on the brightness adjustment signal. For example, in case the received brightness adjustment signal indicates that the brightness is to be increased, the controlling unit will control the first accommodation part 31 to rotate such that the aligned region between the first opening 41 and the second opening 42 is enlarged, resulting in an increase in the size of (and a variation in the position of) the opening structure formed by both of them. As such, the amount of light that is irradiated by the light source 2 to the light incident surface 11 of the light guide plate 1 is increased and in turn, the amount of light that is transmitted through the light emergent surface 12 of the light guide plate 1 is increased, thereby resulting in an increase in the brightness of the display. When the first accommodation part 31 rotates to a point where the first opening 41 is completely aligned with the second opening 42 (as shown in FIG. 6), the opening structure becomes the largest in size and directly faces the light incident surface 11 of the light guide plate 1, and the display is therefore illuminated with a maximum brightness. Instead, in case the received brightness adjustment signal indicates that the brightness is to be reduced, the controlling unit will control the first accommodation part 31 to rotate such that the aligned region between the first opening 41 and the second opening 42 is decreased, resulting in a decrease in the size of and a variation in the position of the opening structure formed by both of them (as shown in FIG. 7). As such, the amount of light that is irradiated by the light source 2 to the light incident surface 11 of the light guide plate 1 is decreased and in turn, the amount of light that is transmitted through the light emergent surface 12 of the light guide plate 1 is decreased, thereby resulting in a decrease in the brightness of the display. When the first accommodation part 31 rotates to a point where the first opening 41 is completely not aligned with the second opening 42, there will be no light irradiated from the light source 2 to the light incident surface 11 of the light guide plate 1, and thus the display is illuminated with a minimum brightness. In another example, when the first accommodation part 31 rotates to a point where the first opening 41 is in partial alignment with the second opening 42, the display will be illuminated with an intermediate brightness between the maximum one and the minimum one.

In the above embodiments, the second accommodation part 34 is for ease of explanation illustrated as being held fixed, and the first accommodation part 31 is illustrated as being rotatable, although this may not be the case. For example, the first accommodation part 31 may be held fixed, with the second accommodation part 34 being rotatable. Alternatively, both the first accommodation part 31 and the second accommodation part 34 may be rotatable. In addition, the second accommodation part 34 is illustrated as being sleeved inside the first accommodation part 31, although this may not be the case. For example, the second accommodation part 34 may be sleeved outside the first accommodation part 31. Furthermore, the rotation axis (axes) of the first accommodation part 31 (and potentially the second accommodation part 34) is (are) illustrated perpendicular to the direction of the thickness of the light guide plate 1, although in other implementations it (they) may be parallel to the direction of the thickness of the light guide plate 1.

Furthermore, in the above embodiments, the backlight module is illustrated as being a side-edge backlight where the light source is disposed at the end surface of the light guide plate 1. However, the principle of the present disclosure may also be applied to certain direct backlight modules where a light guide plate is employed. At this point, the light source 2 and the lampshade 3 may be arranged beneath the light guide plate 1, i.e. they are still located at one side of the light guide plate 1, except that the light incident surface is the lower surface of the light guide plate 1.

According to an embodiment of the present disclosure, there is further provided a display apparatus comprising thereon the backlight module as described above. The display apparatus may be a display panel, a mobile phone, a tablet, a TV set, a display, a laptop, a digital frame, a navigation device or any other product or component that has a display function.

Those of skill in the art will appreciate that the various control devices described in connection with the embodiments disclosed herein may be implemented as electronic hardware, computer software, or combinations of both. Some of the embodiments and implementations are described above in terms of functional and/or modules and various processing steps. However, it should be appreciated that such control devices (or modules) may be realized by any number of hardware, software, and/or firmware components configured to perform the specified functions. To clearly illustrate this interchangeability of hardware and software, the control devices have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a control device may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The above embodiments are for illustration of the present disclosure, and not limitation of the present disclosure. Various modifications and variations may be made by the ordinary skilled person in the art without departing from the spirit and scope of the present disclosure, and all such modifications and variations therefore fall into the scope of the present disclosure. The protection scope of the disclosure is only defined by the appended claims.

The invention claimed is:

1. A backlight module, comprising:
   a light guide plate;
   a light source located at a side of the light guide plate, the side being a light incident surface of the light guide plate;
   a lampshade for accommodating the light source, the lampshade comprising a first accommodation part and being provided with an opening structure with an adjustable size, the opening structure comprising a first opening provided on the first accommodation part, one end of the first opening being provided with a first extendable/retractable part, the other end of the first opening being provided with a second extendable/retractable part, the opening structure being arranged such that light emitted by the light source and passing through the first opening impinges on the light incident surface of the light guide plate when the first opening faces toward the light incident surface of the light guide plate; and
   a control device configured to perform adjustment of the size of the opening structure by controlling extension/retraction of at least one of the first extendable/retractable part and the second extendable/retractable part, wherein the control device is further configured to perform adjustment of the position of the opening structure by controlling rotation of the first accommodation part.

2. The backlight module according to claim 1, wherein the lampshade further comprises a second accommodation part which is sleeved with the first accommodation part, the opening structure further comprising a second opening provided on the second accommodation part, and wherein the control device is further configured to perform adjustment of the size and/or position of the opening structure by controlling rotation of at least one of the first accommodation part and the second accommodation part.

3. The backlight module according to claim 2, wherein the opening structure is in one of the states that the first opening is completely, partially or completely not aligned with the second opening.

4. The backlight module according to claim 2, wherein one of the first accommodation part and the second accommodation part is held fixed, the other one being rotatable.

5. The backlight module according to claim 2, wherein the first accommodation part and the second accommodation part are coaxial.

6. The backlight module according to claim 1, wherein the control device comprises a signal receiving unit and a controlling unit, the signal receiving unit being used for receipt of a brightness adjustment signal, the controlling unit being used for adjustment of the size and/or position of the opening structure on the lampshade based on the received brightness adjustment signal.

7. A display apparatus, comprising the backlight module as described in claim 1.

* * * * *